Aug. 14, 1945.   R. C. BURT   2,382,289
FORCE GAUGE
Filed Dec. 7, 1942

INVENTOR
ROBERT C. BURT
BY George A. Sullivan

Patented Aug. 14, 1945

2,382,289

UNITED STATES PATENT OFFICE 2,382,289

FORCE GAUGE

Robert C. Burt, Pasadena, Calif., assignor to Lockheed Aircraft Corporation, Burbank, Calif.

Application December 7, 1942, Serial No. 468,300

6 Claims. (Cl. 73—141)

This invention relates to force gauges and particularly to a force gauge adapted to measure pressure between the electrode tips of a spot welding machine.

Various types of force gauges have heretofore been constructed and used for measuring the pressure or force exerted between the tips of spot welding electrodes, such devices usually being of bulky construction and requiring wide separation of the welding tips in order to accommodate the pressure measuring device. Under such conditions where the electrodes were separated from the normal welding position the pressures measured were not representative of true operating conditions.

The object of the present invention is to supply a force gauge which is relatively thin between the points of application of the force to be measured whereby it may be readily inserted between the welding tips of spot welding machines and welding electrode pressures measured under conditions in which the electrodes are in the approximate position normally occupied during welding operations.

The object is accomplished in general by means of a device in which the invention is embodied, comprising an elongated beam supported near one end at two relatively closely spaced points to form a short, end supported or simple span portion, and a relatively long overhanging cantilever span portion. The force to be measured is adapted to be applied at the approximate center of the short, end supported span portion of the beam to produce a deflection which is a function of the magnitude of the applied force. This deflection is reflected into the overhanging cantilever span as an angular movement about its inner support and the resultant movement of the free end of the relatively long cantilever span then constitutes a magnified measure of the said deflection and hence in turn a measure of the applied force to be gauged.

Other objects and features of novelty of the invention will be evident hereinafter.

In the drawing wherein a preferred embodiment of the invention is shown by way of illustration and in which the same reference numerals refer to the same or similar elements:

Figure 1:
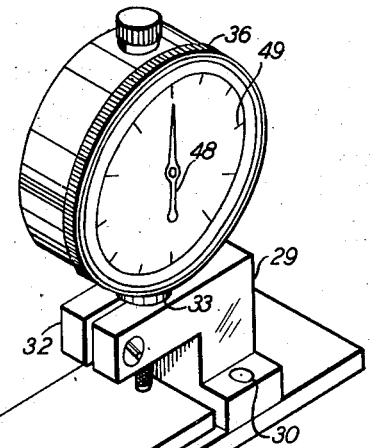
Figure 1 is an isometric view of the general assembly of the apparatus.
Figure 1:
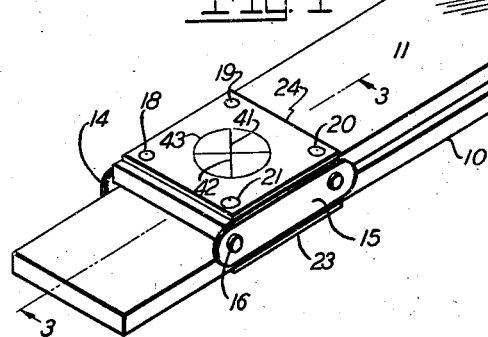

The apparatus is as follows:

The base member 10 which may be constructed in the form of a relatively long thin bar, or in any other convenient shape, serves as a common support for the assembly of apparatus elements hereinafter enumerated. A beam 11 is supported adjacent one end of the base member 10 and in parallelism therewith upon a pair of laterally positioned parallel rods 12 and 13, the longitudinal spacing of which is maintained by means of a pair of link members 14 and 15, which make loose fits against the opposite edges of the base 10 and beam member 11. The said rod supports 12 and 13 define an end supported span portion 27 and a cantilever portion 26. The links 14 and 15 are retained in position by means of heads formed upon the exposed ends of the said rods 12 and 13 as best shown at 16 in Figures 1 and 2, or by other suitable means such as by soldering. The beam 11 and base member 10 are held in substantial parallel assembled relationship with one another, upon the beforementioned spacing rods 12 and 13 by means of rivets 18—21 which pass through coaxially aligned holes in both the beam 11 and base 10 and through a pair of oppositely positioned clamping plates 23 and 24. The heads of the rivets 18—21 are preferably countersunk into the said clamping plates 23 and 24 and are not driven tight but are left with sufficient slack to allow deflection of the beam and base under the applied force without binding, as hereinafter described.

Adjacent the free end 25 of the cantilever portion 26 of the beam 11, an angular shaped supporting pedestal 29 is attached to the base 10 by means of a pair of suitable rivets or machine screws as shown at 30. An overhanging, bifurcated projection 32 of the pedestal 29 is provided with a drilled opening 33 adapted to receive and clamp the cylindrical shank 35 of a dial indicator type of micrometer gauge, as shown at 36, in such a position over the free end of the beam 10 that the actuating plunger 37 of the said indicator may bear upon the upper surface of the beam adjacent the outer unsupported end thereof, as shown at 38.

Figure 2:
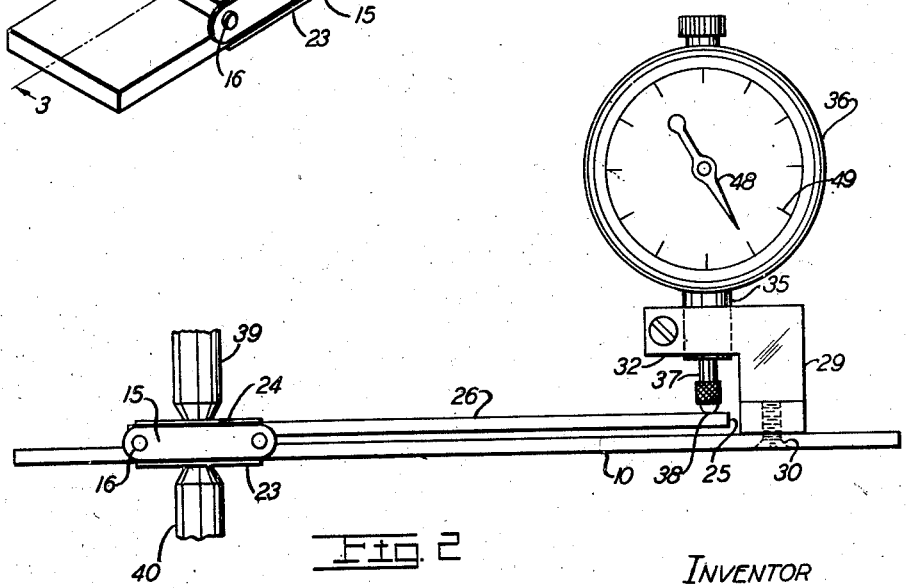
Figure 2 is a side elevation of the device showing the electrode tips in fragmentary view in normal position for the application of the force to be measured.

A target indicating the proper position of application of the electrode tip to the instrument when pressure is to be measured, as illustrated at 39 and 40 in Figure 2, is indicated by the cross lines 41 and 42 and circle 43 which are scribed into the upper surface of the clamping plate 24. The clamping plates are preferably made of a suitable insulating material such as Micarta, which makes it possible to insert the gauge between the welding tips at any time for gauging the welding pressure without the necessity of deenergizing the electrical circuit of the welding apparatus.

Figure 4:
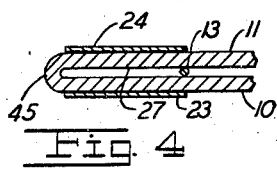
Figure 4 is a fragmentary cross-section of an optional construction of the portion of the apparatus shown in Figure 3.

In an optional form of construction the base member 10 and the beam 11 may be constructed in one piece by welding the pieces together or by bending the bar stock back upon itself to form a U shaped unit as shown at 45 in Figure 4. In this arrangement, the rod 13 which constitutes a common support for the inner end of the end supported span 27 and the cantilever 26, may be retained in proper position by any suitable device such as for example by spot welding to the inner surface of either the base member 10 or the beam 11, but to avoid restraint at this point, it preferably should not be welded to both. The cover plates 23 and 24 in this case may be fastened to the outer surface of the U shaped unit at the point where electrode pressure is applied, by means of a plastic adhesive or by means of suitable clips, not shown.

The operation is as follows:

The gauging device is inserted between the welding tips 39 and 40 which are closed as shown in Figure 2 to bring the electrode ends to bear upon the opposite plates 23 and 24 at a point approximately centrally located with respect to the supporting rods 12 and 13 as indicated by the beforementioned position guide lines 41 and 42 and circle 43 scribed onto the upper plate 24.

Figure 3:
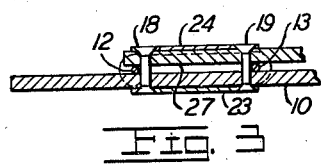
Figure 3 is a fragmentary cross-section taken on line 3—3 of Figure 1.

As pressure corresponding to the welding pressure cycle is applied to the electrodes 39 and 40 the ends of which bear upon the opposite plates 23 and 24, the resultant force is transmitted through to the center portion of the beam span 27 carried between the supports 12 and 13 causing a bending stress which results in an inward deflection. This deflection causes a counterclockwise angular rotation of the beam in the region of the support 13 as viewed in Figure 3, which in turn is reflected in an amplified upward motion of the free outer end 25 of the cantilever portion 26 of beam 11.

The plunger 37 bearing at 38 upon the outer end of the beam 11 is thereby displaced vertically a distance which is an amplified function of the degree of bending of the beam in the span 27 between the rod supports 12 and 13 under the electrode forces, the degree of said amplification being determined by the ratio of the distance between supports 12 and 13 and the length of the cantilever 26. The movement of the dial indicator pointer 48 over this scale 49 is a further magnified measure of the displacement of the plunger 37 and hence a greatly magnified measure of the applied electrode forces.

By placing this device between tips similar to those shown at 39 and 40 but which are incorporated in a testing machine by means of which known compressive forces may be applied to the instrument, the graduations of the indicator dial 49 may readily be calibrated to read directly in any units of electrode force desired or a calibration curve may be established by means of which the readings of the standard graduations of the dial 49 may be readily transposed into corrected pressure or force values.

That portion of the base 10 lying between the supports 12 and 13 and to which the lower electrode tip pressure is applied also flexes under the bending stress thus applied in a manner similar to that of the beam 11 which adds to the relative angular movement of the base 10 and the cantilever portion 26 of the beam 11 about the axis of the rod support 13.

The gauge shown at 36 may be of any suitable standard manufacture such as for example the Starret dial indicator No. 81—K graduated in thousandths of an inch from 0 to 20.

The base 10 and beam 11 may be any suitable metal, such as for example heat-treated X4130 steel bar stock approximately one inch wide by $\frac{5}{32}$ inch thick. The clamping plates 23 and 24 may be constructed of a suitable metal, but preferably of fibre, plastic, or the like insulating material, such as for example, Micarta. The rods 12 and 13 may be steel drill rod stock approximately $\frac{1}{16}$ inch in diameter and the retainer links 14 and 15 of Phosphor bronze. The materals and dimensions may be widely varied to suit the conditions to be encountered and range of forces to be gauged.

The foregoing is merely illustrative of a method and apparatus of the invention and is not to be limiting. The invention includes any method and apparatus which accomplishes the same results within the scope of the claims.

I claim:

1. A force gauge characterized by being of relatively thin construction adapted to measure the force between spot weld electrodes in substantially their normal operating positions with respect to one another, comprising in combination a base member, a beam supported closely adjacent to and in substantial parallelism with said base member upon two supports, said supports being spaced apart longitudinally a distance relatively short with respect to the length of said beam and thereby defining a relatively short end-supported span portion and an integral, relatively long cantilever portion of said beam, said end-supported span portion being adapted to receive a transverse concentrated loading corresponding to the force to be measured and means attached to the end portion of said base member and adapted to be actuated by lateral displacement of the end of said cantilever portion with respect to said base member to indicate relatively the magnitude of said force.

2. A force gauge characterized by being of relatively thin construction adapted to measure the force between spot weld electrodes in substantially their normal operating positions with respect to one another, comprising in combination a base member, a beam supported closely adjacent to and in substantial parallelism with said base member upon two supports, said supports being spaced apart longitudinally a distance relatively short with respect to the length of said beam and said base members, and thereby defining relatively short end-supported span portions and adjacent relatively long projecting cantilever portions of said beam and said base members, said end-supported span portions being adapted to receive a transverse concentrated loading corresponding to the force to be measured and means attached to the end portion of one of said projecting cantilever portions and coupled with the end portion of the other adjacent cantilever portion adapted to be actuated by lateral displacement of the ends of said cantilever portions with respect to one another to indicate relatively the magnitude of said force.

3. A force gauge in accordance with claim 2 in which the said beam and base members are integrally joined at one of said supports to form a unitary structure.

4. A force gauge characterized by being of relatively thin construction adapted to measure the force between spot weld electrodes in substantially their normal operating positions with respect to one another, comprising in combination a base member, a beam supported closely adjacent to and in substantial parallelism with said base member upon two roller pivots, said rollers being spaced apart longitudinally a distance relatively short with respect to the length of said beam and thereby defining relatively short simple span portions and adjacent relatively long projecting cantilever portions of said beam and base members, link members extending along the sides of said simple span portions of said beam and base members to retain said roller pivots in longitudinal spaced relationship between said beam and said base members, means to retain said link members and said roller pivots associated therewith in predetermined position with respect to said beam and said base member, said simple span portions intermediate said roller pivots being adapted to receive a transverse concentrated loading corresponding to the force to be measured, and means attached to the end portion of one of said cantilever portions and coupled with the end portion of the other adjacent cantilever portion, and adapted to be actuated by lateral displacement of the ends of said cantilever portions with respect to one another, to indicate relatively the magnitude of said applied force.

5. A force gauge in accordance with claim 4 with a relatively thin layer of insulation fixed to the external surface of at least one of said simple span portions at a point adapted to receive the force of a spot welder electrode.

6. A force gauge characterized by being of relatively thin construction adapted to measure the force between spot weld electrodes in substantially their normal operating positions with respect to one another, comprising in combination a base member, a beam supported closely adjacent to and in substantial parallelism with said base member upon two supports, said beam and base members being integrally joined at one of said supports to form a unitary structure, and said supports being spaced apart longitudinally a distance relatively short with respect to the length of said beam and said base members, and thereby defining relatively short end-supported span portions and adjacent relatively long projecting cantilever portions of said beam and said base members, said end-supported span portions being adapted to receive a transverse concentrated loading corresponding to the force to be measured and means attached to the end portion of one of said projecting cantilever portions and coupled with the end portion of the other adjacent cantilever portion adapted to be actuated by lateral displacement of the ends of said cantilever portions with respect to one another to indicate relatively the magnitude of said force.

ROBERT C. BURT.